(12) United States Patent
Okubo

(10) Patent No.: US 6,710,572 B2
(45) Date of Patent: Mar. 23, 2004

(54) DRIVE CONTROLLER FOR BRUSHLESS MOTORS

(75) Inventor: Toshiro Okubo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/944,902

(22) Filed: Aug. 30, 2001

(65) Prior Publication Data
US 2002/0030464 A1 Mar. 14, 2002

(30) Foreign Application Priority Data

Sep. 8, 2000 (JP) ........................................ 2000-273407

(51) Int. Cl.$^7$ ................................................. H02P 7/36
(52) U.S. Cl. ........................ 318/727; 318/254; 318/439
(58) Field of Search ................................. 318/727, 802, 318/254, 798, 799, 800, 801–811, 731, 138, 439, 434, 139, 701; 388/806

(56) References Cited

U.S. PATENT DOCUMENTS 4,629,959 A * 12/1986 Okuyama et al. ........... 318/727

* cited by examiner

Primary Examiner—Robert Nappi
Assistant Examiner—Renata McCloud
(74) Attorney, Agent, or Firm—Hogan & Hartson, LLP

(57) ABSTRACT

A drive controller for brushless motors, comprising: a multiplicity of switching means each having a first switching element connected between a first power supply providing a first potential and an output terminal of the drive controller, and a second switching element connected between the output terminal and a second power supply providing a second potential; oscillator means for generating triangular signals; position signal generation means for generating sinusoidal position detection signals based on the signal detected by a position detector of the brushless motor; and comparator means for comparing the magnitudes of the triangular signals with the sinusoidal position detection signals to generate PWM signals. The first switching element and the second switching element of each switching means are turned ON/OFF alternately by the PWM signals. The mean potentials of the triangular signals and the sinusoidal position detection signals are set to the same potential.

5 Claims, 10 Drawing Sheets

DRIVE CONTROLLER FOR BRUSHLESS MOTORS

FIELD OF THE INVENTION

The invention relates to a drive controller for controlling brushless motors in use as motors for driving discs of audio systems, video tape recorders, and personal computers.

BACKGROUND OF THE INVENTION

This type of controllers for brushless motors is described, for example, in Japanese Patent Laid-Open Publication No. 10-146085. This conventional drive controller has a structure as shown in FIG. 1. The controller is operated using various control signals as shown in FIG. 2 controlling various components thereof as will be discussed in more detail below.

In the prior art, a brushless motor M has a permanent magnetic rotor and three-phase armature coils U, V, and W arranged on a circumference of a stator. The stator has rotor-position detectors, one for each of the armature coils, located at the respective armature coils. For brevity, these rotor-position detectors 11 are shown in FIG. 1 altogether outside the brushless motor M.

As shown in FIG. 1, transistor switches for the three-phase motor M consist of P-channel type Metal Oxide Semiconductor field effect (MOS) transistors QUH, QVH, QWH connected to the positive potential source VDD (such transistors hereinafter referred to as positive side transistors), and N-channel type MOS transistors QUL, QVL, QWL connected to the ground (such transistors hereinafter referred to as negative side transistors). The P-channel type and N-channel type transistors are turned ON/OFF by the gate controlling signals supplied to the respective gates of the transistors.

The rotor-position detector 11 may be formed of, for example, hall elements to generates three "positive phase" sinusoidal signals in response to the rotating magnetic field created in the U, V, and W coils, and three sinusoidal "negative phase" signals which are the inversions of the respective positive phase signals. The three phase signals are out of phase with each other by 120° (=360°/3 coils).

A position-detection/phase-shifting circuit 14 takes a difference between the positive and negative outputs contained in the respective three-phase outputs HU, HV, and HW received from the rotor-position detector 11 to eliminate noises that exist in common in the signal lines. Thus, the position-detection/phase-shifting circuit 14 generates six difference signals HU-HV, HV-HW, HW-HU, HV-HU, HW-HV, and HU-HW. From these signals, phase-shifted signals HU1, HV1, and HW1 having a phase difference Δθ=30°, for example, can be generated as shown in FIGS. 2(a)–(c). These phase-shifted signals HU1, HV1, and HW1 serve as position detection signals. Each of the phase-shifted signals HU1, HV1, and HW1 is compared with the inverted version of the respective phase-shifted signals to generate polarity-determination signals UHL, VHL, and WHL for the respective U, V, and W phases, respectively.

The reason for forming three phase-shifted signals HU1, HV1, and HW1 is as follows. There is a delay between the point when the armature of the motor M is actuated by a signal received from the rotor-position detector 11 and the point when the armature is actually energized by an energizing current that flows therethrough, due to the inductance of the armature. The delay depends on the time constant, which is determined by the inductance of the armature. Thus, the commutation time of the current through the armature delays behind the normal commutation time, which can harm the driving efficiency of the motor and entail fluctuation of torque.

A full-wave rectifier 15 rectifies the phase-shifted signals HU1, HV1, and HW1 received from the position-detection/phase-shifting circuit 14 and generates three full-wave outputs HU2 (FIG. 2(d)), HV2, and HW2, which are fed to a comparator 16. The reference potential of the HU2, HV2, and HW2 is taken to be the ground potential Vgnd. Waveforms of the signals HV2 and HW2 are not shown in FIG. 2.

The oscillator 13 includes a built-in triangular signal generation circuit for generating high frequency triangular signals OSC (FIG. 2(e)) in the frequency range above 16 KHz for example, which are fed to the comparator 16. The triangular signal generation circuit includes an operational amplifier, a constant current power supply, and a condenser. The triangular signals OSC also has a reference voltage equal to the ground potential Vgnd.

The comparator 16 receives rectified full-wave signals HU2, HV2, HW2 and triangular signals OSC from the oscillator 13, and compares them to generate pulse width modulation (PWM) signals UPWM, VPWM, and WPWM from their differences.

Pre-drive circuits 17U, 17V, and 17W provided for the respective three phases receive PWM signals UPWM, VPWM, WPWM from the comparator 16, and polarity discrimination signals UHL, VHL, and WHL for the respective phases from the position-detection/phase-shifting circuit 14 directly or via the comparator 16. These pre-drive circuits invert or switches PWM signals UPWM, VPWM, WPWM in accordance with the polarity discrimination signals UHL, VHL, WHL to form gate control signals VUGH, VUGL, VVGH, VVGL, VWGH, and VWGL as shown in FIGS. 2(f)–(k), which control signals are supplied to the P-channel type MOS transistors QUH, QVH, and QWH on the positive side, and to the N-channel type MOS transistors QUL, QVL, QWL on the negative side.

As a typical example, take gate control signals VUGH and VUGL for the U-phase. It is seen in FIG. 2 that in the first half period shown of FIG. 2, the positive side MOS transistor QUH is turned ON and OFF by the gate control signal VUGH, while the negative side MOS transistor QUL is turned OFF by the gate control signal VUGL. In the second half period, on the other hand, the positive side MOS transistor QUH is turned OFF by the gate control signal VUGH, while the negative side MOS transistor QUL is turned ON and OFF by the gate control signal VGUL. It is noted that in both the positive side MOS transistor QUH and the negative side MOS transistor QUL, a backward current flows through a back gate contact of the transistor and a parasitic diode associated with it during the OFF periods.

A torque instruction circuit 12 generates control signals for controlling the rotational speed of the motor M by controlling the amplitudes of the phase-shifted signals HU1, HV1, and HW1. This can be done by comparing a measured value Vdet indicative of the actual speed of the motor M and a preset value Vs and controls the amplitudes in accordance with the differences between them.

In this arrangement, if, for example, the measured value Vdet representing the actual speed of the motor M is greater than the preset value Vs (i.e. the motor is faster than the intended speed), the torque instruction circuit 12 supplies the position-detection/phase-shifting circuit 14 with a control signal determined by the difference between them to reduce the amplitudes of the phase-shift signals HU1, HV1, HW1. Accordingly, the rectified full-wave signals HU2, HV2, HW2 are output from the full-wave rectifier 15 with a reduced wave height.

The reduction of the height of the rectified full-wave signals HU2, HV2, HW2 results in a decrease in the pulse width of the PWM ON-OFF duty pulses UPWM, VPWM, WPWM issued from the comparator 16, which in turn decreases the current energizing the motor M via the MOS transistors QUH QWL for the respective U, V, and W phases. If the rotational speed is lower than the preset value, the current to the motor is increased by the same mechanism to thereby raise the speed of the motor. In this manner, the motor speed is controlled precisely.

In this conventional drive controller, the gate control signals VUGH VWGL shown in FIGS. 2(f)–(k) are supplied to the MOS transistors QUH QWL in the respective phases, such that the negative side MOS transistors are turned OFF while the positive side MOS transistors are turned ON and OFF while PWM controlled in the respective phases. Conversely, the positive side MOS transistors are turned OFF while the negative side MOS transistors are turned ON and OFF during the PWM control.

FIGS. 3 and 4 illustrate PWM control in the U-phase when the positive side MOS transistor QUH is turned ON and OFF in the PWM control, while the negative side MOS transistor QUL is turned OFF. It is noted that, in this instance, a drive current I flows in the direction shown by a solid arrow when the positive side MOS transistor QUH is ON, and a regeneration current I flows in the direction as indicated by a broken arrow when the positive side MOS transistor is OFF, as shown in FIG. 3. Since the negative side MOS transistor QUL is turned OFF, the regeneration current I flows through a parasitic diode Pd via the back gate contact of the negative side MOS transistor QUL. A similar regeneration current will take place when the conduction status of the positive side and negative side MOS transistors are reversed, and the same is true with other MOS transistors in V and W-phases.

This implies that the power loss due to the regeneration current I through the parasitic diode Pd is fairly large since the potential drop Vf by the parasitic diode Pd is about 0.7 Volts. Unfortunately, this takes place continuously during the PWM control.

In conventional drive controller, rectified full-wave signals HU2, HV2, HW2 received from a full-wave rectifier 15 are compared with the oscillation signals OSC received from the oscillator 13 to form PWM signals UPWM, VPWM, WPWM in the comparator 16. It is noted that, in these comparison, the reference potential is set to the ground potential Vgnd.

In particular, the oscillator 13 generates triangular signals, by using the operational amplifier, the constant current power supply, and the condenser, as a basis for the switching operation to increase/decrease the electric current, wherein the switching is performed at an upper and a lower peaks (upper and lower apexes) of a triangular wave. In this case, however, generation of triangular waves cannot be accurately controlled since the magnitude of overshooting varies with the frequency of the oscillator 13 and since different characteristics of the constant current power supplies on the positive and the negative sides as well as variations in the manufacturing processes all affects the triangular signals generated.

Under these conditions, the triangular signals OSC of the oscillator 13 can have a blind zone above the ground potential in case that the minimum voltage (of the lower edges or lower apexes) of the triangular signals does not reach the ground potential Vgnd, as shown in FIG. 5, or a portion of the lower edges remain at the ground potential Vgnd, thereby deforming the triangular signals, as shown in FIG. 6.

If such a blind zone takes place or the lower edges of the triangular signals stays at the ground potential, the oscillator cannot provide sufficient output power even under a torque instruction, or minimum pulse width of the output signals may become very large. If this happens, the motor cannot be properly controlled.

SUMMARY OF THE INVENTION

It is therefore an object of the invention to provide a drive controller for brushless motors capable of performing PWM control with a reduced power loss caused by regeneration current during the PWM control, without inducing any blind zone or distortion in the output of the PWM control oscillator.

In accordance with one embodiment of the invention, there is provided a drive controller for brushless motors, comprising:

a multiplicity of switching means each having
a first switching element connected between a first power supply providing a first potential and an output terminal of the drive controller, and
a second switching element connected between the output terminal and a second power supply providing a second potential;

oscillator means for generating triangular signals;

position signal generation means for generating sinusoidal position detection signals based on the signal detected by a position detector of the brushless motor; and comparator means for comparing the magnitudes of the triangular signals with the sinusoidal position detection signals to generate PWM signals, wherein the first switching element and the second switching element of each switching means are turned ON/OFF alternately by said PWM signals.

The first and the second switching elements of each switching means can be a P-channel type MOS transistor and an N-channel type MOS transistor, respectively.

Each of the PWM signals generated by the comparator means may be split to two signals, one for each of the first and the second switching elements when the first and the second switching elements are P-channel type MOS transistor and N-channel type MOS transistor, respectively.

In this drive controller for a brushless motor, when one of these switching elements, for example the first one, QUH, is turned ON and OFF by a PWM signal, the other one, i.e. the second switching element QUL, will be conversely turned OFF and ON. That is, in the PWM control, the second switching element QUL will be turned OFF when the first switching element QUH is turned ON, and vice versa. Consequently, a regeneration current of the motor will flow through the conducting switching element, not through a parasitic diode Pd as in the conventional switches. The voltage drop Von across the conducting transistor due to its resistance (said resistance hereinafter referred to as ON-resistance) is in the range of 0.1–0.2 Volts, which is much smaller than the voltage drop Vf (about 0.7 Volt) of a parasitic diode Pd. Hence, the power loss due to the regeneration current can be reduced accordingly.

It is noted that, in the arrangement described above, sinusoidal position detection signals from the position signal generation means 14 are used in the comparator means as they are (i.e., without being rectified) to generate a PWM signal. The PWM signals may be applied to the first and the second switching elements (e.g. QUH and QUL, respectively) without inverting them in phase, or applied with their phases inverted, depending on the channel type of the switching elements used. In this instance, polarity discriminating signal is not needed, as is needed in conventional controllers.

In the invention, the mean or central potential of the triangular signals generated by the oscillator means can be set to the same mean potential of the sinusoidal position detection signal generated by the position signal generation means. The controller may be provided with a constant voltage generation means that generates a first potential, a second potential which is higher than the first potential by a predetermined potential, a third potential which is lower than the first potential by a predetermined potential so that the mean potential of the sinusoidal position detection signal and the mean potential of the triangular signals are set to the first potential by feeding the first potential to the position signal generation means, and by feeding the second and the third potentials to the oscillator means. Thus, the oscillator means has the second potential as its upper limit and the third potential as its lower limit.

In this arrangement, the triangular signals do not involve a blind zone or a distortion, since the triangular signals are not offset above the ground potential Vgnd nor stays at the ground potential as in the conventional controller. It is noted that the mean potential of the triangular signals and the sinusoidal position detection signals are set to coincide. Thus, the output duty of the PWM signals can be fully utilized over the range between 0 and 100%, so that fine drive control can be effected, even for a minute rotation.

DETAILED DESCRIPTION OF THE PREFERRED EMBODIMENT

The inventive drive controller for brushless motors will now be described in detail by way of example with reference to accompanying drawings.

Figure 7:
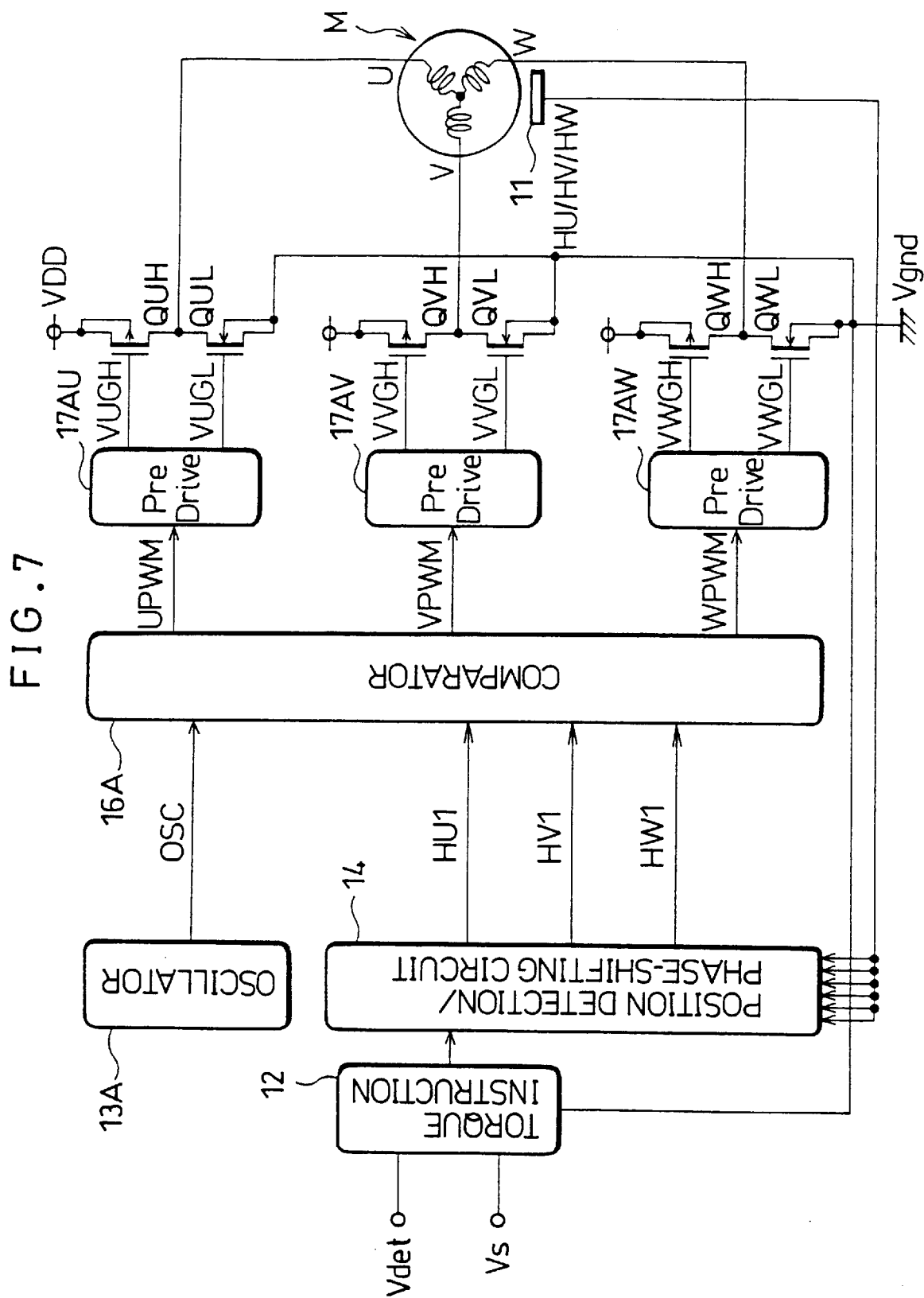
FIG. 7 is a circuit diagram of a drive controller for a brushless motor according to the invention.
Figure 8:
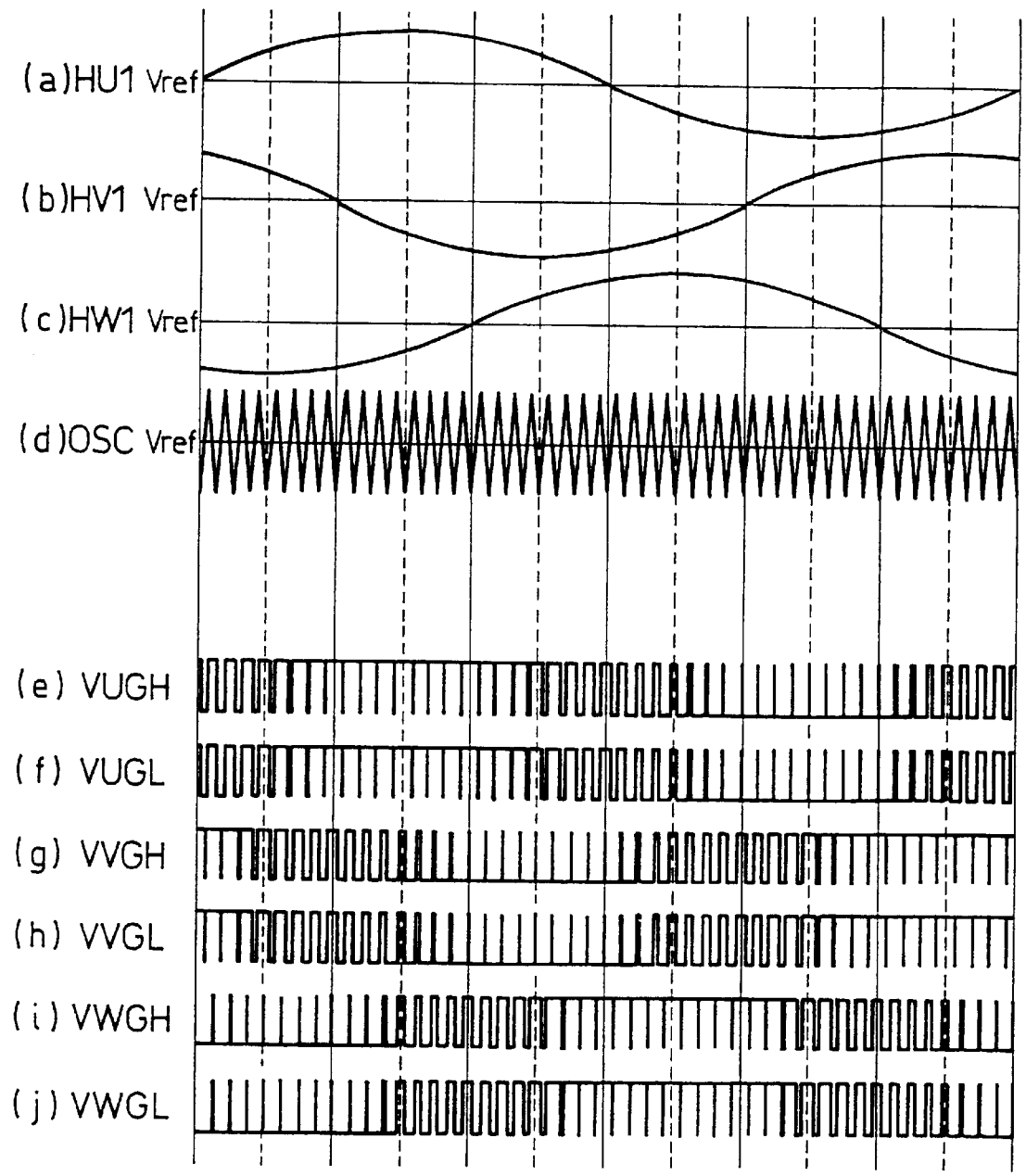
FIG. 8 shows waveforms of signals appearing at various elements of the drive controller of FIG. 7.

FIG. 7 shows a structure of a drive controller for a brushless motor according to the invention. FIG. 8 shows waveforms of signals appearing at various elements of the drive controller shown in FIG. 7.

Figure 1:
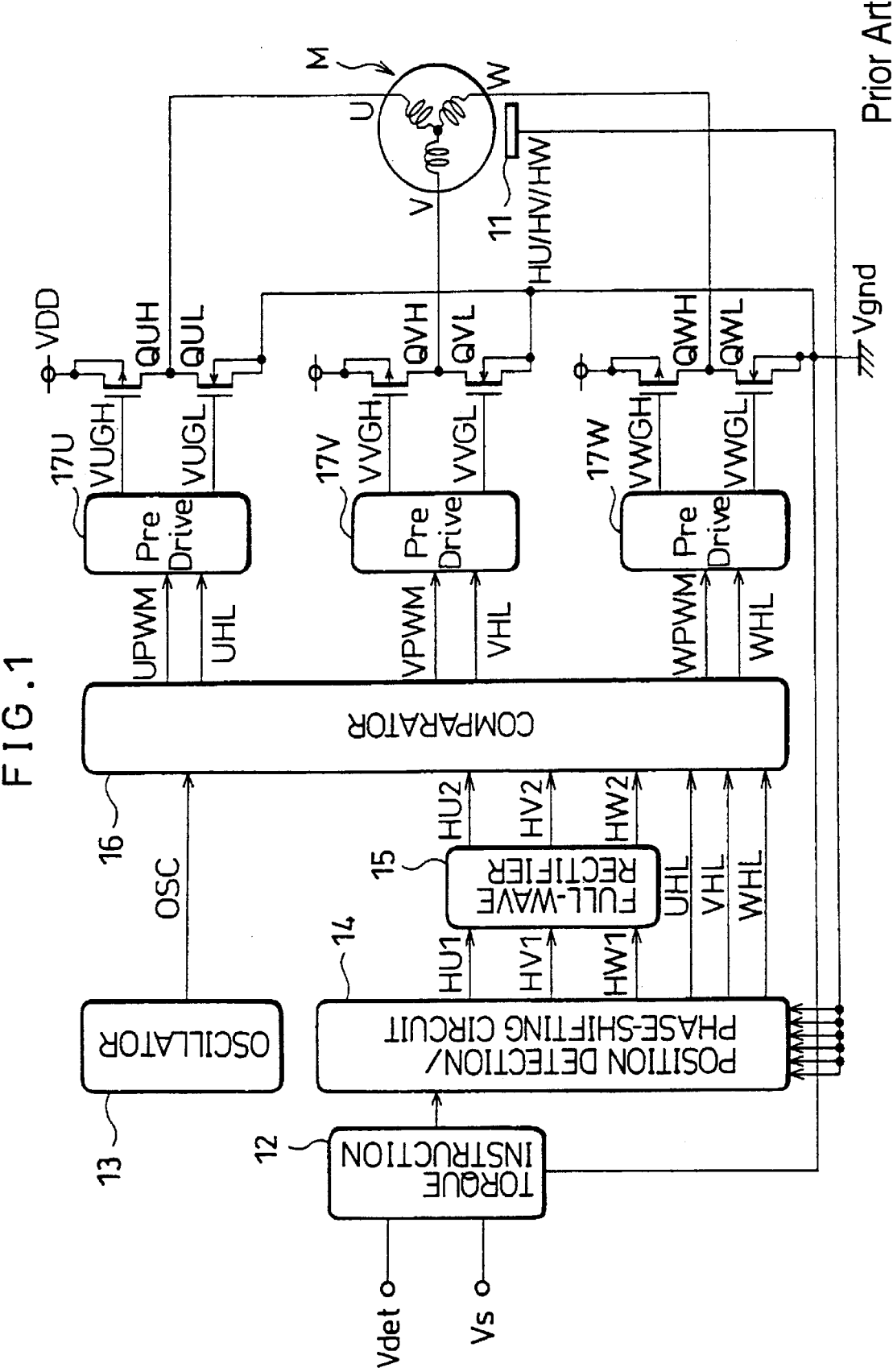
FIG. 1 shows an arrangement of a conventional drive controller for a brushless motor.
Figure 2:
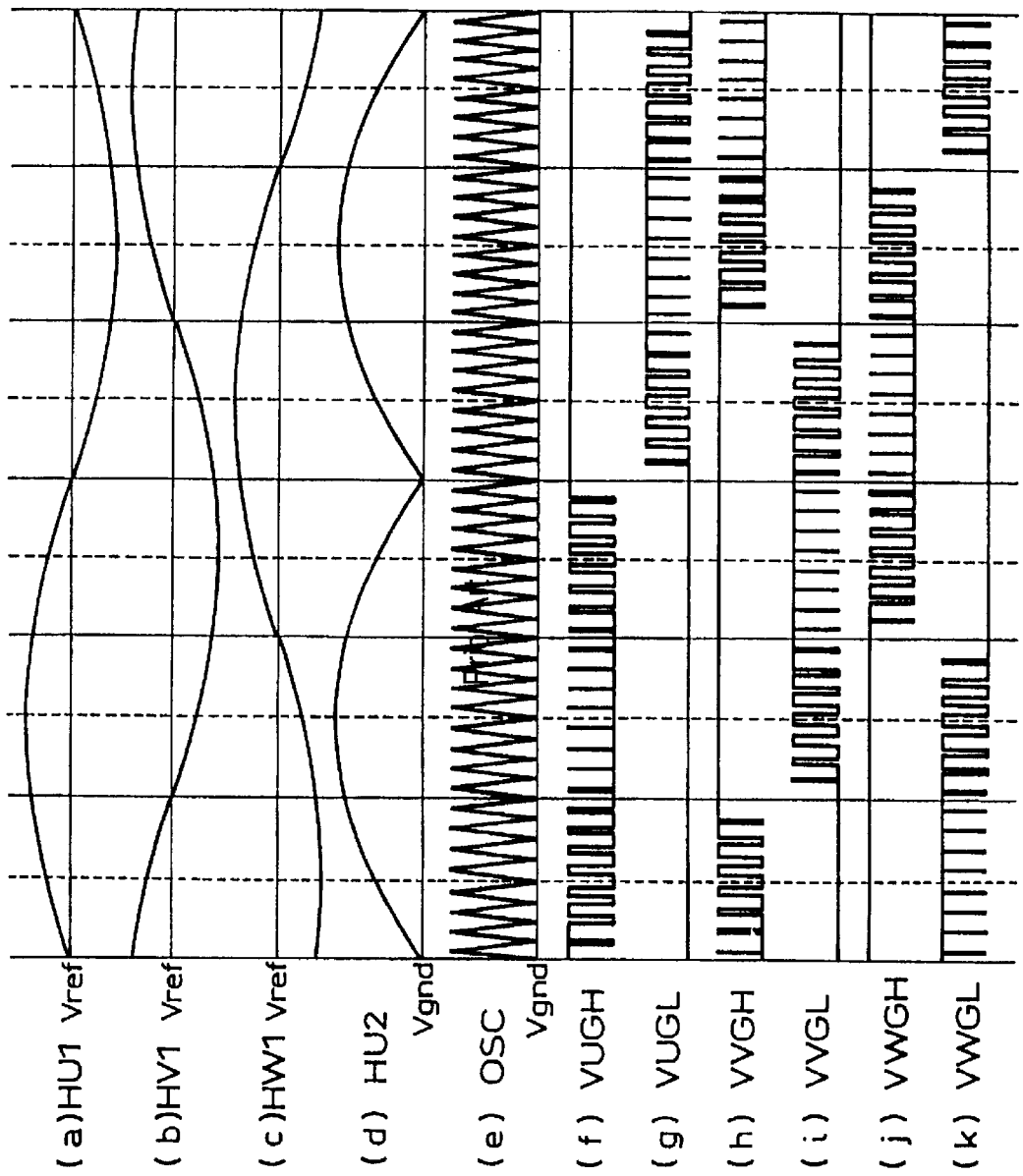
FIG. 2 shows waveforms of signals appearing at various nodes of the drive controller shown in FIG. 1.
Figure 3:
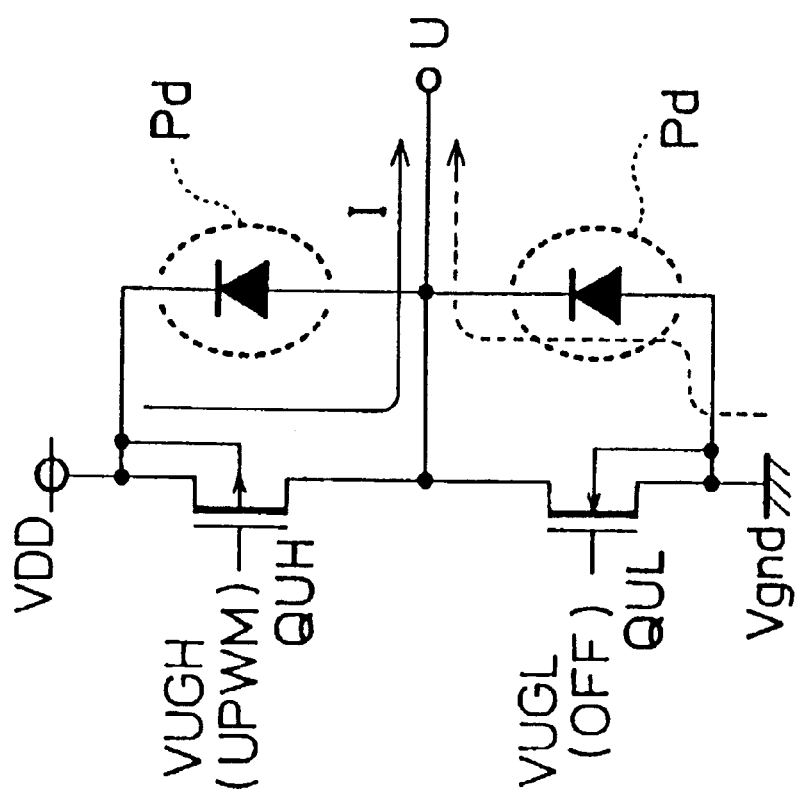
FIG. 3 shows the functions of a typical switch used in a conventional drive controller.
Figure 4:
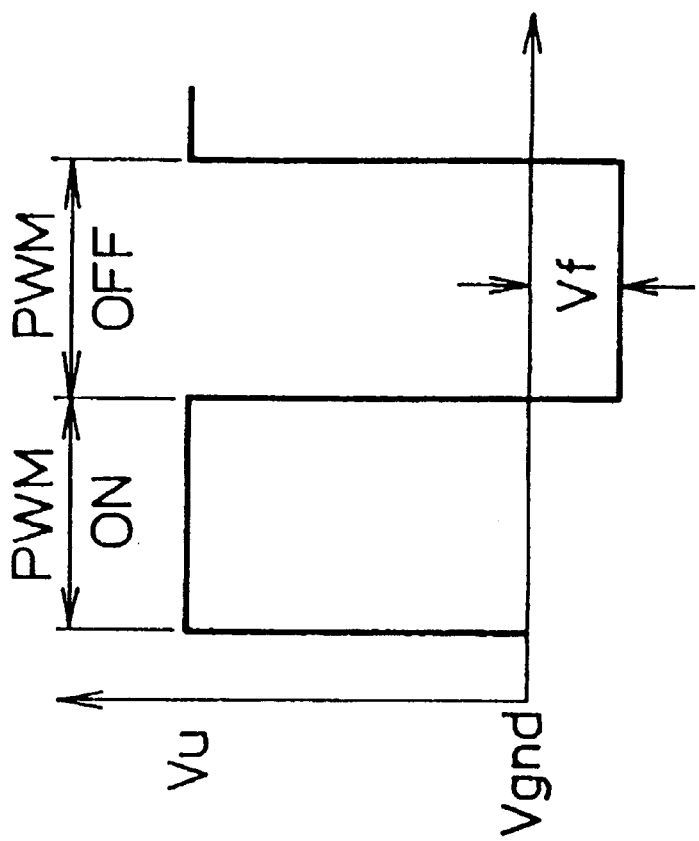
FIG. 4 shows an PWM operation of a conventional drive controller.
Figure 5:
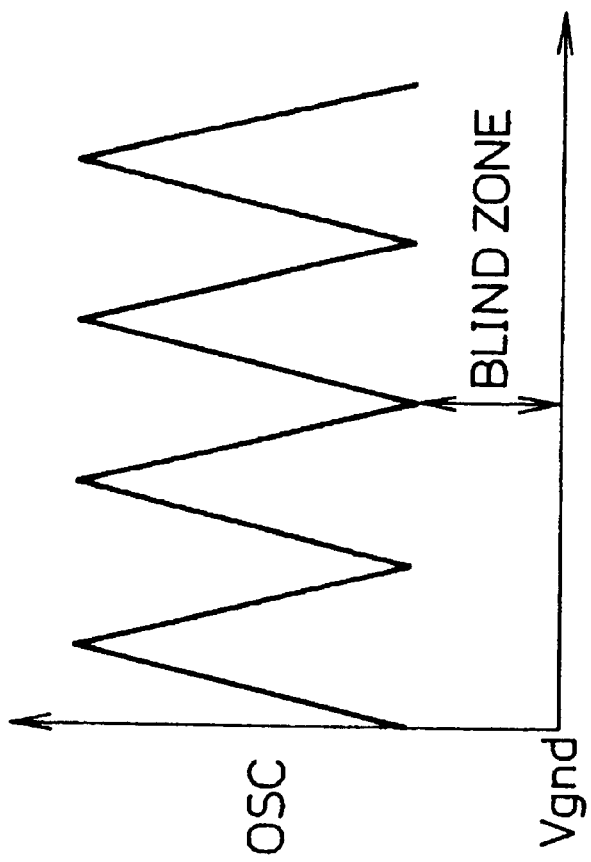
FIG. 5 shows triangular signals of a conventional drive controller involving a blind zone.
Figure 6:
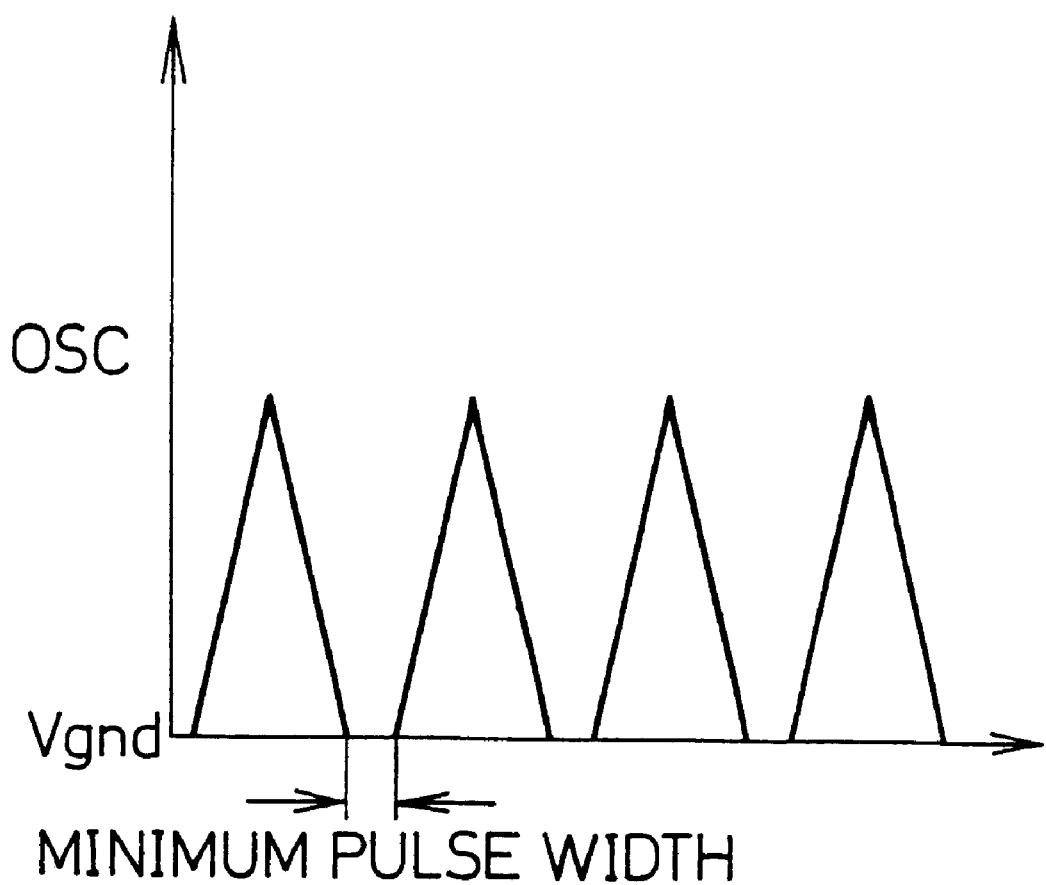
FIG. 6 shows triangular signals of a conventional drive controller involving a distortion.

As seen in FIG. 7, it would be recognized that the drive controller of the invention differs from the corresponding conventional drive controller shown in FIG. 1 in that a full-wave rectifier 15 nor a position-detection/phase-shifting circuit 14 supplying polarity discrimination signals UHL, VHL, and WHL to a pre-drive circuit 17U–17W of FIG. 1 is not needed. It would be also recognized that the oscillator 13, the comparator 16, and the pre-drive circuit 17U–17W of FIG. 1 are modified in structure and hence in function in the corresponding elements shown in FIG. 7. The modified elements are indicated by like or corresponding reference numerals with a symbol A attached thereto in FIG. 7.

Other elements of FIG. 7 including a rotor-position detector 11, a torque instruction circuit 12, position-detection/phase-shifting circuit 14, and transistor switches for three phases (positive side P-channel type MOS transistors QUH, QVH, QWH and negative side N-channel type MOS transistors QUL, QVL, QWL) are the same as the corresponding switches of FIG. 1, for which further detailed description will be omitted.

Figure 9:
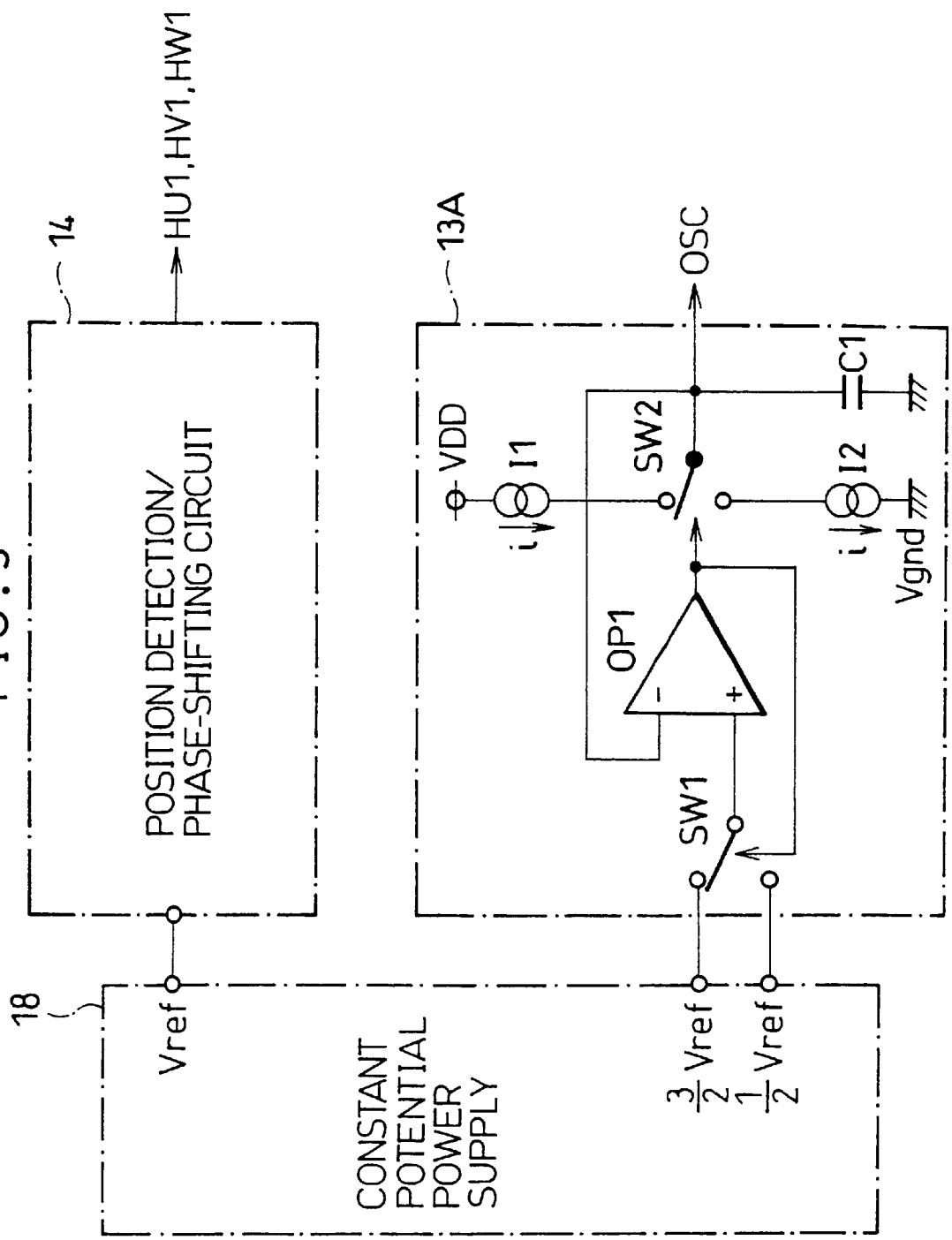
FIG. 9 shows a structure of an oscillator according to the invention.

The oscillator 13A includes a switch SW1 for switching between two input potentials, an operational amplifier OP1, a integration condenser C1, a source side constant current power supply I1, a sink side constant current power supply I2 and a switch SW2 for switching the constant current power supplies, as shown in FIG. 9.

As seen in FIG. 9, the oscillator 13A is supplied with a high potential $\frac{3}{2}$ Vref, which is $\frac{3}{2}$ times a constant reference potential Vref, and a low potential $\frac{1}{2}$ Vref which is $\frac{1}{2}$ the constant reference potential Vref, from a constant voltage power supply 18. The oscillator oscillates when the high potential $\frac{3}{2}$ Vref is fed to the operational amplifier OP1, and a constant current i is fed from the source side constant current power supply I1 to the condenser C1. As the potential of the condenser C1 reaches $\frac{3}{2}$ Vref, the output of the operational amplifier OP1 is inverted, thereby switching the connections of the switches SW1 and SW2. The operational amplifier OP1 is now fed with the low potential $\frac{1}{2}$ Vref, which causes the condenser C1 to discharge its charges, thereby liberating a constant current i therefrom to the sink side constant current power supply I2. As the potential of the condenser C1 lowers to $\frac{1}{2}$ Vref, the output of the operational amplifier OP1 is inverted, thereby switching the connections of the respective switches SW1 and SW2.

The switching operations are repeated to generate triangular signal and output from oscillator 13A. The triangular signal OSC has a maximum voltage of $\frac{3}{2}$ Vref and a minimum voltage of $\frac{1}{2}$ Vref, and the mean potential equal to the reference potential Vref. Thus, if an overshoot changed during the switching operation, or if the source side and the sink side constant current power supply have different characteristics, or if variations in manufacturing processes are not negligible, there can be no significant problem affecting the control signals, except for a minor change in the gain of the drive controller. The drive controller will not suffer from the blind zone problem nor signal distortion problem pertinent to the conventional drive controller mentioned above.

In the example shown herein, the reference potential Vref is supplied from the constant potential power supply 18 to the position-detection/phase-shifting circuit 14, which generates sinusoidal phase-shifted signals HU1, HV1, and HW1 serving as the position detection signals. These sinusoidal phase-shifted signals have mean potentials equal to the reference potential Vref.

The comparator 16A are fed with the sinusoidal phase-shifted signals HU1, HV1, and HW1 oscillating about the reference potential Vref, and the triangular signals OSC also oscillating about the mean potential Vref. In the comparator 16A, the U-phase signal HU1 and the triangular signal OSC are compared to generate a U-phase PWM signal UPWM at one output terminal of the comparator. Similarly, the V-phase and W-phase signals HV1 and HW1, respectively, are compared with the triangular signal OSC to generate the respective PWM signals, VPWM and WPWM, at the respective output terminals.

Pre-drive circuits 17AU–17AW generate PWM drive signals which cause the positive side transistors and the negative side transistors of the switches to be turned ON and OFF alternately, that is, the two switches are turned ON and OFF exclusively in turn. Looking at the U-phase for example, the positive side transistor switch is a P-channel type MOS transistor, while the negative side transistor switch is an N-channel type MOS transistor, as shown in FIG. 7. Hence, the PWM signals UPWM input to the pre-drive circuit may be split to two PWM drive signals VUGH and VGUL having the same phase for the two transistor switches. It would be understood that when both of the transistors are of N-channel type, the input signal UPWM should be split to two signals having opposite phases.

In the example shown herein, the speed of the motor M is detected by a speed detector (not shown) which generates a signal Vdet proportional to the actual rotational speed of the motor M. The measured potential Vdet is compared with a preset reference potential Vs in a torque instruction circuit 12, which in turn generates and supplies a control signal indicative of the difference between the measured potential Vdet and the preset reference potential Vs to a position-detection/phase-shifting circuit 14 so as to bring the speed of the motor M to the preset speed.

The position-detection/phase-shifting circuit 14 receives signals HU, HV, and HW from a rotor-position detector 11 and the control signal from the torque instruction circuit 12 to generate phase-shifted sinusoidal control signals HU1, HV1, and HW1 oscillating about a mean potential equal to Vref as seen in FIG. 9. These signals have the same controlled amplitude and phases mutually shifted by a predetermined phase, as shown in FIG. 8. These sinusoidal phase-shifted signals HU1, HV1, and HW1 are fed to the comparator 16A.

On the other hand, the triangular signal OSC, oscillating about the reference potential Vref, is fed from the oscillator 13A to the comparator 16A, as described previously in connection with FIG. 9. The triangular signal OSC is shown in FIG. 8(d).

Comparing the triangular signal OSC with the respective sinusoidal phase-shifted signals HU1, HV1, and HW1, the comparator 16A generates three-phase PWM signals UPWM, VPWM, and WPWM to be supplied to the respective pre-drive circuits 17AU, 17AV, and 17AW.

The pre-drive circuits 17AU, 17AV, and 17AW form six gate control signals VUGH–VWGL based on the three-phase PWM signals UPWM, VPWM, WPWM, and feed these gate control signals to the respective gates of the MOS transistors QUH–QWL.

In the example shown herein, since the positive side MOS transistors QUH, QVH, QWH are P-channel type MOS transistors, and since the negative side MOS transistors QUL, QVL, QWL are N-channel type MOS transistors, the gate control signals VUGH–VWGL are mutually out of phase by 120°, as shown in FIGS. 8(e)–(j), and furthermore, the pair of the positive side and the negative side gate control signals (e.g. VUGH and VUGL) are in phase.

Incidentally, the pre-drive circuits 17AU, 17AV, and 17AW are preferably provided with timing means for regulating the time interval of the respective gate control signals VUGH–VWGL so that both the positive side MOS transistor QUH (QVH, QWH) and the negative side MOS transistor QUL (QVL, QWL) will never be conducted simultaneously, so as not to make a current to flow from the power supply VDD to the ground voltage Vgnd.

As described above, in the inventive drive controller, three-phase gate control signals VUGH–VWGL are applied to the respective MOS transistors QUH–QWL to control the switching of MOS transistors in the respective U, V, and W phases such that the negative (positive) side MOS transistor is turned OFF/ON when the positive (negative) side MOS transistor is turned ON/OFF, and vice versa, as shown in FIGS. 8(e)–(j).

Figure 10:
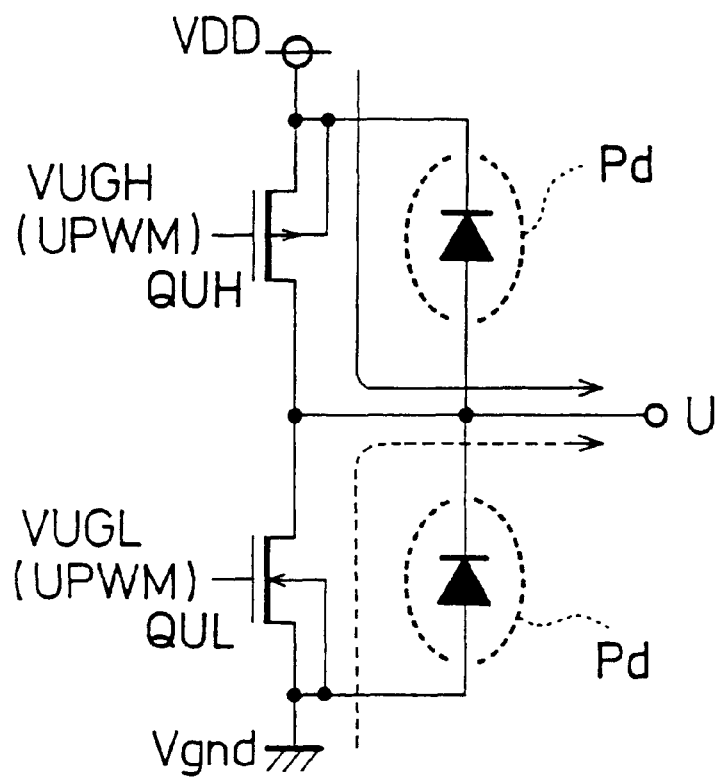
FIG. 10 shows the functions of a typical switch according to the invention.
Figure 11:
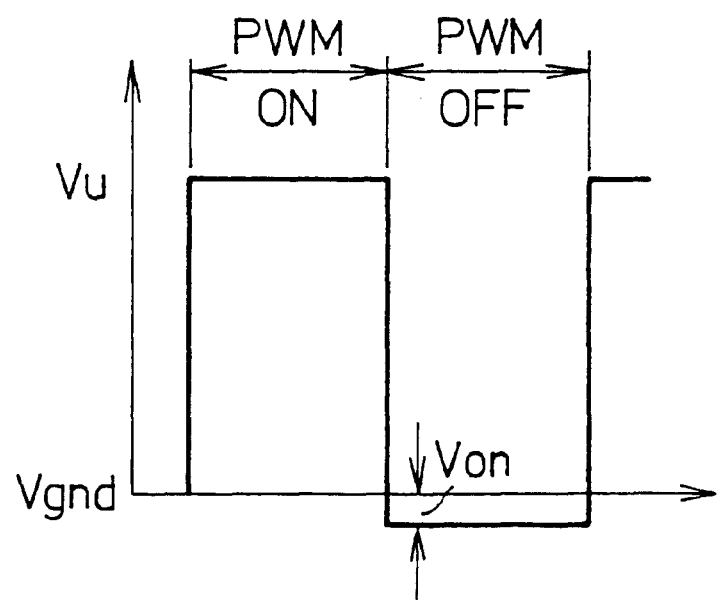
FIG. 11 shows an PWM operation according to the invention.

FIGS. 10 and 11 illustrate the PWM control of the U-phase. It is seen that when the positive side P-channel type MOS transistor QUH is turned ON/OFF by the gate control signal VUGH, the negative side N-channel type MOS transistor QUL is turned OFF/ON by the gate control signal VUGL which is in phase with the signal VUGH.

Hence, when the positive side MOS transistor QUH is ON in the PWM control, a regeneration current I flows through the conducting transistor QUH in the direction as indicated by a solid arrow, while the negative side MOS transistor QUL remains OFF. If, on the other hand, the positive side MOS transistor QUH is turned OFF in the PWM control, so that the negative side MOS transistor QUL remain ON, a regeneration current I flows thorough the transistor QUL in the direction indicated by a broken arrow.

Under this condition, since the negative side MOS transistor QUL is turned ON in the PWM control, the regeneration current I will not flow through a parasitic diode Pd as in conventional controller, but through the negative side MOS transistor QUL. This principle applies to the switches in other phases.

Since it is easy to make a MOS transistor having a low ON-resistance in the range of 0.1–0.2 Volts for example, the voltage drop Von across the conductive MOS transistor can be made very small as compared with the voltage drop Vf of about 0.7 Volt by a parasitic diode Pd. Thus, in comparison with a conventional drive control circuit for which power loss due to regeneration current I through a parasitic diode Pd is I×Vf, the inventive drive controller can greatly cut the power loss to I×Von under the voltage drop Von by a MOS transistor.

It would be appreciated that the triangular signal OSC of the oscillator 13 will not be spoiled by a blind zone nor deformed by the ground potential Vgnd, because the mean potentials of the both triangular signals and the sinusoidal phase-shifted signals HU1, HV1, HW1 are set to the same potential Vref of the constant potential power supply 18. The comparator IGA is stable, since the comparison is made with reference to the stable reference potential Vref. It would be appreciated that a full-wave rectifier like a conventional full-wave rectifier 15 is not needed.

In the example shown in FIG. 7, the positive side output elements are P-channel type MOS transistors, and negative side output elements are N-channel type MOS transistors. However, it would be clear to a person of ordinary skill that both output elements may be of the same type, for example N-channel type MOS transistors, junction type FETs, or PNP type/NPN type bipolar transistors in place of MOS transistors.

It would be clear to a person of ordinary skill that the output signal of the oscillator 13A may be conveniently modified within the scope of the invention. For example, the oscillator may outputs a sawtooth signal.

Although the invention has been described with particular reference to certain preferred embodiments of a three-phase drive controller for a brushless motor as shown in FIG. 7, variations and modifications of the present invention can be effected within the scope of the invention. For example, the invention can be applied to a single phase as well as a multi-phase (e.g. six-phase) drive controllers.

What I claim is:

1. A drive controller for brushless motors, comprising:

a multiplicity of switching means each having a first switching element connected between a first power supply providing a first potential and an output terminal of said drive controller, and a second switching element connected between said output terminal and a second power supply providing a second potential;

oscillator means for generating triangular signals varying between a maximum and a minimum potential and about a mean potential;

position signal generation means for generating sinusoidal position detection signals based on the signal detected by a position detector of said brushless motor, said sinusoidal position detection signals varying about a mean potential; and comparator means for comparing the magnitudes of said triangular signals with said sinusoidal position detection signals to generate PWM signals, wherein the mean potential of said triangular signals and the mean potential of said sinusoidal position detection signals are set to the same reference potential, wherein said first switching element and said second switching element of each switching means are turned ON/OFF alternately by each pulse of said PWM signals; wherein when said first switching element is turned ON/OFF by each pulse of said PWM signals, said second switching element is turned OFF/ON by each pulse of said PWM signals which is in phase with said first switching element: and wherein when said second switching element is turned ON/OFF by each pulse of said PWM signals, said first switching element is turned OFF/ON by each pulse of said PWM signals which is in phase with said second switching element.

2. The drive controller for brushless motors according to claim 1, wherein first and second switching elements of each switching means are MOS transistors.

3. The drive controller for brushless motors according to claim 2, wherein said first switching element is a P-channel type MOS transistor and said second switching element is a N-channel type MOS transistor.

4. The drive controller for brushless motors according to claim 3, wherein each of said first and second switching elements is simultaneously supplied with split PWM signals from said comparator means.

5. A drive controller for brushless motors, comprising:

a multiplicity of switching means each having a first switching element connected between a first power supply providing a first potential and an output terminal of said drive controller, and a second switching element connected between said output terminal and a second power supply providing a second potential;

oscillator means for generating triangular signals varying between a maximum and a minimum potential and about a mean potential;

position signal generation means for generating sinusoidal position detection signals based on the signal detected by a position detector of said brushless motor, said sinusoidal position detection signals varying about a mean potential;

comparator means for comparing the magnitudes of said triangular signals with said sinusoidal position detection signals to generate PWM signals; and a constant voltage generation means that generates a first potential; and a second potential which is higher than said first potential by a predetermined potential; and a third potential which is lower than the first potential by a predetermined potential, wherein said mean potential of said sinusoidal position detection signals is set to said first potential; and said mean potential, maximum potential, and minimum potential of said triangular signals of said oscillator means are set to said first, second, and third potentials, respectively;

wherein said first switching element and said second switching element of each switching means are turned ON/OFF alternately by each pulse of said PWM signals; and wherein said mean potential of said triangular signals and said mean potential of said sinusoidal position detection signals are set to the same potential.

* * * * *